Figure 1:
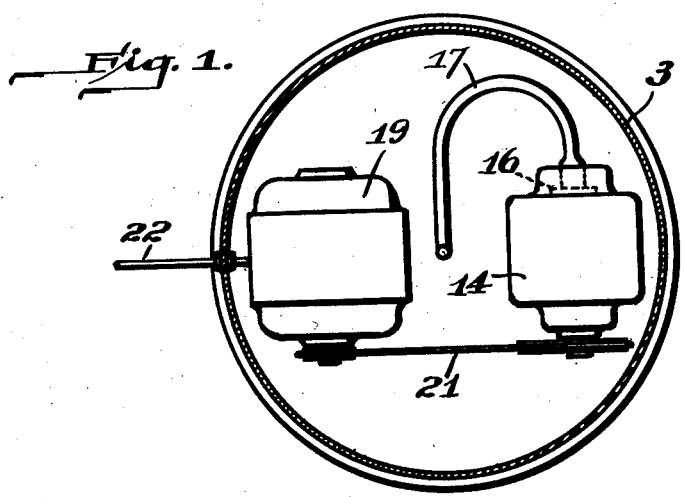

Aug. 15, 1933.  L. ROUSH  1,922,749
CREAM WHIPPING APPARATUS
Filed May 5, 1931   2 Sheets-Sheet 1

WITNESSES
A. B. Wallace
J. E. Dickinson

INVENTOR
Lee Roush
by Brown & Critchlow
his Attorneys

Aug. 15, 1933.    L. ROUSH    1,922,749
CREAM WHIPPING APPARATUS
Filed May 5, 1931    2 Sheets-Sheet 2

WITNESSES
INVENTOR

Patented Aug. 15, 1933

1,922,749

UNITED STATES PATENT OFFICE 1,922,749

CREAM WHIPPING APPARATUS

Lee Roush, Beaver, Pa., assignor, by mesne assignments, to The Hobart Manufacturing Company, Troy, Ohio, a Corporation of Ohio Application May 5, 1931. Serial No. 535,161

13 Claims. (Cl. 261—122)

This invention relates to apparatus for making what is known in the culinary art as whipped cream.

Heretofore it has been the customary practice to make whipped cream by beating or actually whipping the cream. This is done by agitating the cream, by means of some suitable agitating device, until sufficient air is entrapped in the cream, in minute quantities, to maintain it in a substantially stable non-viscous state. Before cream can be whipped satisfactorily in such a manner it is essential that it be cooled to a comparatively low temperature, and that it have a comparatively high percentage of butter fat. Also, that it neither be too old nor too fresh. If these conditions are not substantially adhered to, the cream will frequently either not whip or else the agitation will produce butter before it does a whip. Furthermore, where the cream has once been whipped by an agitating process and is permitted to stand for any length of time and collapse, it is practically impossible to rewhip it. This is due chiefly to the destructive action the agitating devices have upon the emulsified structure of the cream, and it is not infrequent because of this that quantities of cream are rendered a total loss, as far as their use for whipping purposes is concerned, or at least a considerable part of their volume destroyed if it is allowed to set any length of time before being used.

The primary object of this invention is to provide an improved apparatus for whipping cream whereby the above noted difficulties are substantially overcome, the whipping operation considerably simplified, and through the use of which not only creams having relatively low butter fat content may be satisfactorily whipped, but the volume of whipped cream obtainable from them greatly increased.

My invention is predicated upon my discovery that a whip superior to any heretofore obtainable can be produced by dispersing minute streams of air under pressure into a stationary body of cream, the addition of air being continued until a sufficient amount is entrapped in the cream to produce a whip. In practicing the invention I have found that creams of considerably lower butter fat content, than those which may be whipped by agitating means may be satisfactorily whipped in accordance with the invention, and in much less time. Furthermore, that the temperature and age of the cream is not nearly so critical to the whip and that the life of the whip produced is considerably increased, as well as the volume. I have also found that where the whip is permitted to stand and collapse that it can be quickly and easily rewhipped to its original state, which it is practically impossible to do with a whip produced by agitating devices.

In accordance with my invention air is dispersed under pressure in very finely divided streams into a stationary body of cream. To accomplish this, a container having a bottom wall made of some suitable porous material of exceedingly fine porosity is provided for holding the cream and by other suitable means air under pressure is forced in minute jets or streams into the cream disposed in the container. The air introduced into the cream in this manner produces bubbles which quickly break down into a very fine structure and form a very excellent whip. To speed up the whipping operation the cream may be gently stirred by some suitable stirring device such as a spoon or ladle, the effect of which is to destroy any fissures or air passages which may be formed in the cream if allowed to stand still. For this purpose only a very gentle stirring is required and which like the adding of the air has very little destructive action upon the structure of the emulsion.

It is essential in producing a whip by this method that the porous medium comprising the bottom wall of the container have an extremely fine porosity and that the air pressure applied thereto be such that it will furnish sufficient air to charge the cream but insufficient to force the air entirely through the cream or blow the cream from the container.

Figure 2:
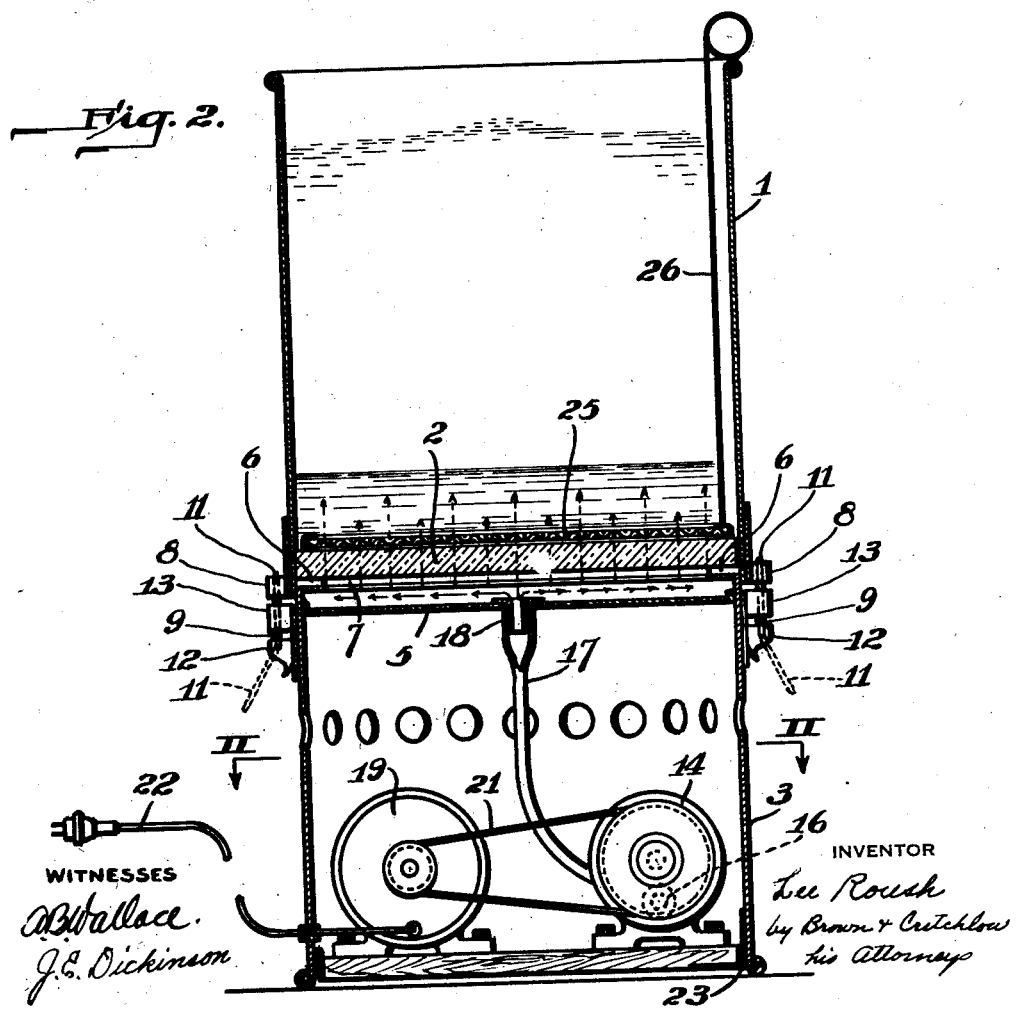

In the accompanying drawings Fig. 1 is a vertical section taken through the center line of a cream whipping device constructed in accordance with the invention; Fig. 2 a horizontal section of the same taken on the line II of Fig. 1; and Fig. 3 a view similar to Fig. 1 of a modification of the invention.

Referring in detail to Figs. 1 and 2 of the drawings, a tank 1 is shown as constituting a container for holding a quantity of cream to be whipped. The bottom wall 2 of this container is formed of a filter type of stone having a very fine porosity and of sufficient thickness to give it the necessary strength and air dispersing qualities required. To prevent leakage the stone is suitably secured in the container in such a manner that the cream and air cannot pass between its periphery and the wall of the container. In the simplified form of structure illustrated, a cylindrical base 3 is provided for supporting container 1, and in it there is provided a pressure chamber 4 below stone 2 which is formed by an air-tight wall 5 secured in the base a short distance from its upper edge. To render the pressure chamber air-tight when the container is placed upon the base a flat yieldable ring-shaped gasket 6 made of some suitable compressible sanitary material, such as cork or material of that character is placed between the bottom of the container and an inwardly extending flange 7 formed about the upper edge of the base cylinder.

In order to firmly and detachably hold the container on the base and at the same time make the connection leak-tight, a plurality of lugs 8, the number of which depends upon the size of the container, are secured about the bottom of container 1 for cooperative engagement with a plurality of trunk type latches 9 secured about the top of base 3. Each of these latches consists of a link 11 which is pivotally mounted on a lever 12 that is in turn pivotally secured to a support 13 mounted on the base 3. To assemble the machine the gasket 6 is placed on flange 7 and container 1 on top of the gasket with lugs 8 in alignment with latches 9. The levers 12 are then raised sufficiently to allow the links 11 to be placed over the tops of the lugs 8. When this is done the levers are forced downward against the wall of the base, whereby due to the eccentric mounting of the links on the levers the container is forced firmly into engagement with the base.

For supplying air under pressure to pressure chamber 4 a rotary compression 14 is arranged on a support 15 in the bottom of base 3 and its outlet 16 is connected by means of a flexible conduit 17 to an inlet 18 formed in wall 5. For operating the compressor an electric motor 19 is also mounted upon the support 15 and operably coupled to the compressor by means of a belt 21, an ordinary conduit and plug 22 being provided for connecting the motor to a light circuit.

In order that access to the motor may be readily had for the purpose of cleaning and repairing it, support 15 is attached at one end by means of a hinge 23 to one side of the base 3 and by means of a latch 24 to the other side. Hence, when it is desired to have access to the motor or compressor the support 15 may be readily rotated outside of the base. To permit such movement the flexible conduit 17 is made sufficiently long to allow the compressor to be moved outside of the base without disturbing its connection with the pressure chamber.

In practicing the invention, I have found that it is essential that the medium employed for forming the bottom wall 2 of the container be made of a material having not only an exceedingly fine porosity, but that it have the ability to disperse the air in a very restricted manner into the cream. The most satisfactory material found to date for this purpose, which is capable of functioning satisfactorily, is what is known in the art as filter stone, and is a type of sandstone having an exceedingly fine porous structure.

In operating the machine to produce a whip, the motor 19 is preferably started before the cream is placed in container 1. When the cream is put in the container and the air is forced upwardly through stone 2, to destroy the formation of fissures or air openings in it, which may if permitted allow a portion of the air to escape and thereby retard the formation of the whip, the cream may be gently stirred by means of a suitable stirring device such as a spoon or ladle. This operation is continued until sufficient air is entrapped in the cream and the structure broken down to a sufficiently fine state to produce a satisfactory whip. Normally such operation requires from one to two minutes, which is a considerably shorter time than that required to produce a whip by the old agitating process.

To remove the whipped cream, the container may be detached from base 3 by releasing latches 9 and the cream emptied into any suitable receptacle. To assist in removing the cream from the container, a screen 25 of fine mesh having a diameter substantially the same as the inside of the container may be placed on the top of the stone 2 before the cream is added and removed after the whipping is completed, by means of a handle 26 arranged to extend to the top of the container. To clean the apparatus after it has been used, the container and stone are preferably washed in boiling water and then placed back on the base and the air turned on until the stone is thoroughly dried.

Figure 3:
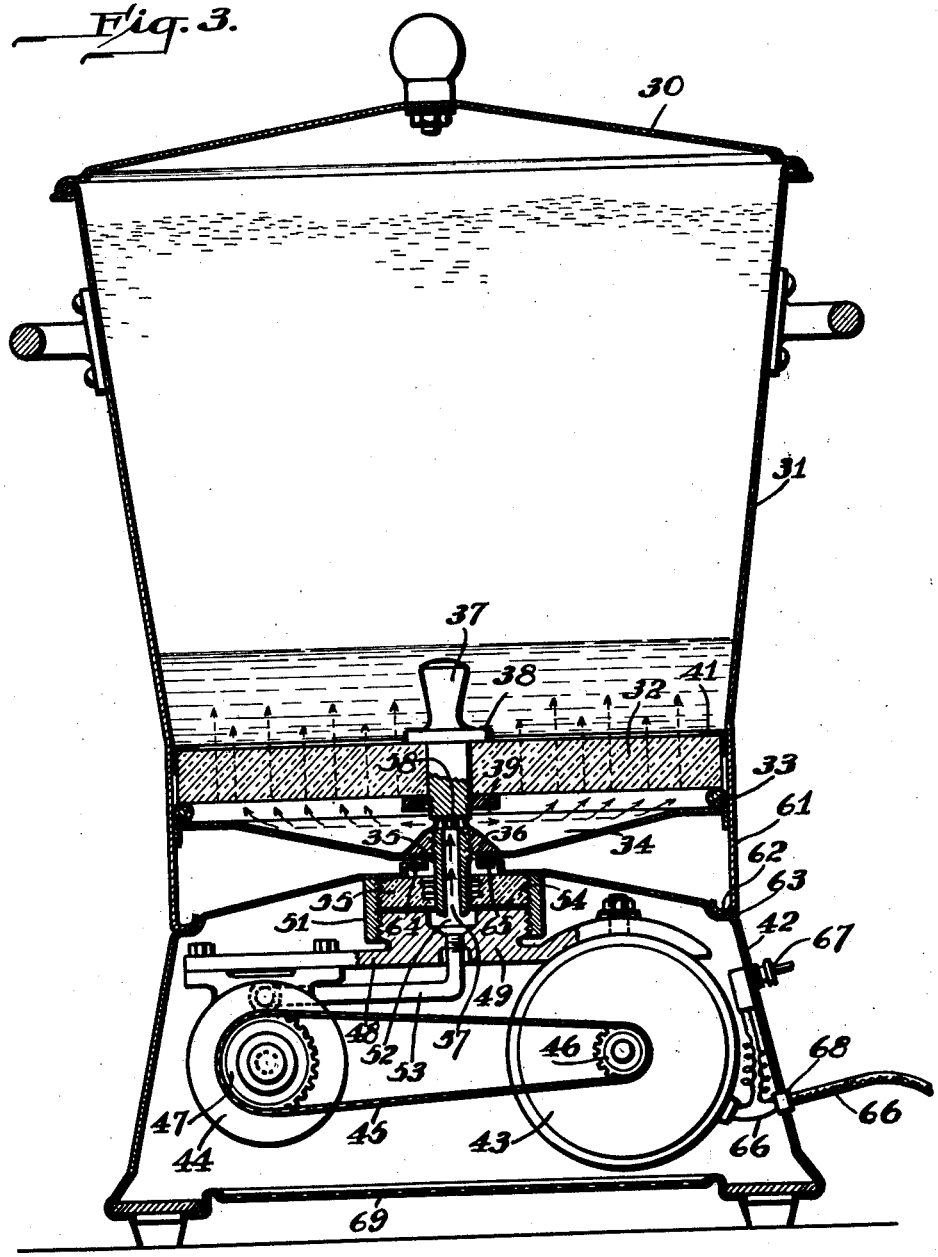

Referring now to Fig. 3 what is at present considered to be the preferred embodiment of the invention is illustrated as comprising a tank 31 which is made somewhat in the shape of an ordinary pail provided with a cover 30. A porous block 32 is fitted in the bottom of this tank with its periphery resting on a rubber or other suitable gasket 33. With this arrangement a pressure chamber 34 for the compressed air is formed between the bottom of the block and the bottom of the tank, the latter being tapered downwardly towards its center to increase its strength as well as to afford greater volume to the chamber. In the center of the bottom of the tank there is provided an opening 35 for admitting the compressed air to chamber 34. About this opening there is secured a hollow boss 36 which is shaped in the form of a cone to facilitate the cleaning of the tank and is extended above the bottom thereof to prevent any fluids, which may be left in the pressure chamber after cleaning or permitted to collect as a result of seepage through block 32, from getting into the air line. The primary purpose of this boss, however, is to provide a substantial support for engaging a pin 37 which is extended through block 32 and used to hold the latter in place.

The pin 37 has a shoulder 38 on its upper end which engages the top surface of block 32 and is threaded in its center portion for engagement in boss 36 which is threaded internally for its reception. To facilitate the assembly and removal of pin 37 and block 32, a nut 39 is screwed onto pin 37 after the pin is passed through the block so that both the block and pin can be removed from and attached to the tank at the same time. To aid in doing this, the upper end of pin 37 is tapered, as shown, so that it can be grasped with ease and turned to place or removed.

Through the use of such a construction no air is permitted to escape about the edge of block 32 because it is forced tightly against gasket 35 by pin 37 and similarly the air is prevented from escaping about pin 37 due to the engagement of shoulder 38 with the top of the block. As a further aid in this connection and also as a means of protecting the edge of the block a molding 41 is mounted on the upper edge of block 32 and held between it and the side of tank 31.

The base of the apparatus is formed by a dome shaped housing 42 in which there are arranged a motor 43 and a rotary compressor 44 coupled together by a chain 45 which is extended over sprockets 46 and 47, respectively, located on the drive shafts of the two devices. Both the motor and the compressor are secured at their tops to a support 48 which is provided on its upper side with a threaded boss 49 by means of which it is adjustably and removably attached to the top of the base as shown. This latter boss is arranged to screw into a threaded sleeve 51 secured to the center of the base dome on the under side thereof and through it there is extended a passage 52 which is connected by a duct 53 with the out-put opening of compressor 44.

In sleeve 51, on top of boss 49, there are arranged a metal washer 54 and a rubber gasket 55. This latter is preferably made up of comparatively soft rubber or other suitable material and adapted to engage the end of pin 37 in a leak-tight fashion, the pin being made smooth and extended below its threaded portion for making such connection. To insure the seal-tight engagement between the pin and gasket the gasket is formed at its center, in the manner shown, to most effectively engage the pin. By reason of such construction, as the gasket wears from use its center may be made to grip the pin tighter merely by screwing boss 49 more tightly into sleeve 51.

In order for the air from passage 52 to be transmitted to chamber 34, a hole 57 is extended upwardly through the lower end of pin 37 and connected to a groove 58 cut in the pin at a point adapted to be positioned above the top of boss 36 when the pin is in place for operation.

To aid in holding tank 31 in place on base 42 its side wall is extended at 61 below its bottom sufficiently to engage the edge of the housing, and to cause it to fit snugly and accurately in place it has a bevel 62 about its lower edge which is designed to rest in a groove 63 formed about the edge of the housing. To further aid in holding it on the base it is provided with lugs 64, below opening 35, which are adapted to be fitted in a slotted crown 65 formed on the top of the housing and to be turned into engagement therewith by a simple turn of the tank, thereby detachably attaching the tank to the base.

For conveniently connecting motor 43 to a source of current supply, leads 66 are extended from the motor through a switch 67 located in the side of housing 42 and through an opening 68 to the outside of the base whereby they may be readily connected to any suitable lamp receptacle or the like. While to provide ready access to the motor and compressor which may be readily removed by simply unscrewing the boss 49 from sleeve 51, as referred to hereinbefore, a removable bottom 69 is fitted in the bottom of housing 42, and to provide adequate ventilation for the operating parts perforations are made in this removable bottom.

With this latter modification of the invention, the tank may be readily removed and carried about with ease to facilitate its use without damage or injury to the porous block and may be cleaned with little difficulty because of its simplicity of construction. A recommended method of cleaning the tank or porous block is to remove the tank after it is used and turn it upside down, then force a flow of cold water through the block by way of pin 37 for a few minutes, then a flow of hot water and thereafter place the tank in place again and dry the block by forcing air through it in the normal way. As will be appreciated, to dry out chamber 34 and also remove the porous block for other purposes, such can be done by merely unscrewing pin 37 and lifting it from the tank.

A suitable machine capable of whipping from one to four pints of cream may be formed with a container 1 having a diameter of from six to seven inches and a sufficient height to hold the whip. The stone forming the bottom may be made from one-quarter to one inch thick and preferably with a porosity of a degree known in the filter art as Grade H. To supply the necessary air pressure a fiftieth horse power motor may be coupled in any suitable manner, such as by means of a belt 21, to a compressor capable of producing in response to the motor a pressure in the pressure chamber of from 3 to 8 or 10 oz. per square inch. These particular pressures are specified as it has been found that it is practically impossible to whip the cream in a machine of this character if the pressure is below 3 oz., and where it is above 10 oz. the air is usually forced completely through the cream instead of being entrapped in it, and also causes much cream to be blown from the container. It will be appreciated that for larger or smaller machines the size of the parts will be varied in accordance with the capacity of the machines.

As set forth above, the main advantages of the invention are that through its use creams having a considerably low butter fat content may be satisfactorily whipped, the whipping may be accomplished in a much shorter time and a considerably larger volume of whip obtained therefrom than has been heretofore possible. Also, by its use it is possible to not only whip cream at practically any temperature or at any age, but to also rewhip it to its original state after it has once collapsed. Furthermore, the whip produced is drier and has a longer life. It is to be understood that creams as used in this connection are intended to contemplate the use of the invention with various other confections and like commodities having similar characteristics.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. A device for whipping cream comprising a container having a porous stone bottom of relatively fine porosity, a support for said container, a pressure chamber in said container below said stone bottom, and means for supplying air under pressure to said pressure chamber.

2. A device for whipping cream, comprising a detachable container, a porous wall forming the bottom of said container, a base for said container, a wall in said base forming a pressure chamber with said porous wall, a gasket for effecting a seal between said base and said container, and means for forcing air under pressure into said pressure chamber.

3. A device for whipping cream comprising in combination, a container having a porous wall forming its bottom, a support for said container, means in said support forming a pressure chamber below said porous bottom, means for supplying air under pressure to said pressure chamber, and means for operating said air supply means.

4. A device for whipping cream comprising in combination, a container having a porous wall forming its bottom, a supporting base for said container, means in said base forming a pressure chamber below said porous bottom, a rotary compressor in said base connected to said pressure chamber, and a means for operating said compressor.

5. A whipping device comprising in combination a base housing having in it a compressor and a motor operably coupled thereto, a tank for containing the material to be whipped mounted on said base, means connecting the outlet of said compressor with said tank and a porous block arranged in the bottom of the tank to form with the lower wall thereof a pressure chamber to which said compressor outlet is connected.

6. A whipping device comprising in combination a base, a compressor having a motor operably coupled to it detachably mounted as a unit in said base, a tank for containing material to be whipped detachably mounted in said base, a porous block arranged to form a pressure chamber in the bottom of said tank and detachable means connecting said compressor to said pressure chamber to force air through said block into material to be whipped contained in said tank.

7. A whipping device comprising in combination a base, a tank detachably mounted on said base, a porous block arranged in said tank to form a pressure chamber in the bottom thereof, a compressor having a motor operably coupled to it mounted in said base, and means connecting the outlet of said compressor to said pressure chamber for forcing air through said block into a body of material to be whipped contained in the tank.

8. A whipping device comprising a tank having a porous block removably arranged in its bottom and adapted to form a pressure chamber with the lower wall thereof, a resilient sealing gasket arranged between said block and the bottom of the tank to prevent air passing between the edge of the block and the side of the tank, a threaded pin designed to engage the block and to extend through it and the bottom of the tank and to be screwed into the latter whereby to detachably hold the block in place, said pin being adapted to extend through the bottom of the tank and having a hole through its lower end communicating with said pressure chamber for conducting air under pressure to said chamber.

9. A whipping device comprising a tank having a porous block loosely mounted in its bottom and adapted to form a pressure chamber with the lower wall thereof, a sealing gasket arranged between the edge of said block and the tank to prevent air passing therebetween, a threaded pin designed to fit loosely in a hole in said block and to engage the upper surface thereof as well as to screw into the bottom of the tank to hold the block in place, said pin being adapted to extend through said tank for connecting said pressure chamber with a source of air under pressure, a hole being extended upwardly through the bottom of the pin for such purpose.

10. A whipping device comprising in combination a tank having a porous block arranged thereon to form a pressure chamber with the lower wall thereof, a base for said tank, a compressor operably coupled to a motor arranged in said base, a gasketed receptacle mounted in said base, means connecting said receptacle to the compressor outlet and a hollow plug adapted to fit in said receptacle secured in the bottom of said tank for detachably connecting said compressor with said pressure chamber.

11. A whipping device comprising in combination a dome shaped base, a cylindrical tank arranged to detachably rest at one end on said base, the wall of the tank being extended below its bottom wall and its edge adapted to nest in a groove extending about the periphery of the base for accurately holding the tank in place, a porous wall arranged in said tank above the bottom thereof to form a pressure chamber therewith and detachable means extending through the bottom of said tank for communicating air under pressure to said pressure chamber.

12. A portable whipping device comprising in combination a tank for containing the material to be whipped, a porous wall arranged in said tank to form a pressure chamber with the bottom wall of the tank, a smooth hollow plug communicating with said pressure chamber and extended through the bottom of said tank for conducting air under pressure to the pressure chamber, a base for supporting said tank, having a hole in its top for receiving said plug, a threaded sleeve secured to the under side of the top of said base below said hole, a rubber gasket disposed in said sleeve for engaging said plug, a detachable compressor and motor support having a threaded boss thereon arranged in said base with said boss threaded into said sleeve, said boss being adapted to be adjusted to vary the pressure in the gasket disposed in the sleeve whereby to vary the pressure applied to said plug by said gasket when the plug is inserted therein, a compressor and motor operably coupled together secured to said support and means connecting the compressor outlet with an opening extending through said boss and the gasket disposed in the sleeve for receiving said plug.

13. A cream whipper comprising a hollow base member, an electrical motor and air pump connected thereto housed within said base member, a vessel supported by and removably mounted upon said base member, an air chamber within said vessel, means connecting said air chamber and said air pump, said means permitting of ready disconnection of said vessel from said base member, and means mounted upon said air chamber for distributing the air from said chamber to within said vessel in the form of fine air jets.

LEE ROUSH.